(12) United States Patent
Eckberg et al.

(10) Patent No.: US 7,909,902 B2
(45) Date of Patent: Mar. 22, 2011

(54) MODIFIED HEXAGONAL PERFORATED PATTERN

(75) Inventors: Eric A. Eckberg, Rochester, MN (US); James D. Gerken, Zumbro Falls, MN (US); Maurice F. Holahan, Lake City, MN (US); Gerard F. Muenkel, Raleigh, NC (US); Joseph D. Rico, Rochester, MN (US); H. Burt Stone, Prospect Hill, MN (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/138,286

(22) Filed: Jun. 12, 2008

(65) Prior Publication Data

US 2009/0308033 A1 Dec. 17, 2009

(51) Int. Cl.
- *H05K 7/20* (2006.01)
- *H05K 9/00* (2006.01)
- *H01L 23/40* (2006.01)

(52) U.S. Cl. ......... 55/385.6; 174/50; 174/382; 174/383; 174/390; 361/679.48; 361/687; 361/690; 361/694; 361/695; 361/800; 361/818; 454/184; 454/192

(58) Field of Classification Search ................. 55/385.6; 174/50, 382, 383, 390; 361/679.48, 687, 361/690, 694, 695, 800, 818; 454/184, 192
See application file for complete search history.

(56) References Cited

U.S. PATENT DOCUMENTS

| | | | |
|---|---|---|---|
| 4,059,713 A | 11/1977 | Mercer | |
| 4,248,075 A | 2/1981 | Whitley | |
| 5,460,571 A * | 10/1995 | Kato et al. | 454/184 |
| 6,426,459 B1 * | 7/2002 | Mitchell | 174/382 |
| 6,610,922 B1 * | 8/2003 | Twiss et al. | 174/390 |
| 6,749,525 B2 | 6/2004 | Aoyama | |
| 6,933,193 B2 | 8/2005 | Wilson | |
| 7,038,124 B1 * | 5/2006 | Sosnowski | 174/383 |
| 7,371,977 B1 * | 5/2008 | Preonas | 174/383 |
| 7,438,638 B2 * | 10/2008 | Lewis et al. | 454/184 |
| 7,492,610 B2 * | 2/2009 | Gilliland | 361/818 |
| 7,522,414 B2 * | 4/2009 | Karstens | 361/690 |
| 7,583,498 B2 * | 9/2009 | Chen et al. | 361/679.48 |
| 2005/0143001 A1 * | 6/2005 | Merlet et al. | 454/184 |
| 2006/0148398 A1 * | 7/2006 | Ruch et al. | 454/184 |
| 2007/0148406 A1 | 6/2007 | Ando et al. | |
| 2008/0113603 A1 * | 5/2008 | Atallah | 454/184 |

FOREIGN PATENT DOCUMENTS

| | | |
|---|---|---|
| EP | 0 715 933 A1 | 12/1996 |
| GB | 1 524 315 | 9/1978 |
| JP | 55 16733 | 2/1980 |
| JP | 3 78956 | 4/1991 |

OTHER PUBLICATIONS

Geometric Patterns, Diamond Manufacturing Catalog, 2004, Michigan City, IN.

* cited by examiner

*Primary Examiner* — Duane Smith
*Assistant Examiner* — Minh-Chau Pham
(74) *Attorney, Agent, or Firm* — Kunzler Needham Massey & Thorpe

(57) ABSTRACT

Described herein are various embodiments of a modified hexagonal perforated pattern and objects within which the pattern is formed. For example, according to one representative embodiment, an apparatus includes an object and a perforated pattern formed in the object. The perforated pattern includes a plurality of perforations through which matter is flowable. Each of the perforations includes a modified hexagonal shape including a hexagon having six rounded corners.

20 Claims, 3 Drawing Sheets

MODIFIED HEXAGONAL PERFORATED PATTERN

FIELD

This disclosure relates to perforated patterns and more particularly, to objects having modified hexagonal perforated patterns.

BACKGROUND

Objects having perforated patterns are used in many applications for providing various functions. Some objects include perforated patterns that facilitate relatively non-impeded flow through the objects. For example, air vent covers having perforated patterns are used in computing devices to facilitate the passage of air flow into and out of the computing devices, such as for cooling processing components of the devices. Air vent covers are also used to attenuate predefined acoustic noise and electromagnetic interference generated by computing devices. In other applications, perforated patterns are used directly as filters for filtering objects having a particular size from other objects having a larger size, or as support or backing for finer particulate filters to prevent bowing of the filter media as objects accumulate on the finer particulate filters.

Perforated patterns in objects, such as air vent covers and filters, have been designed to achieve various particular attributes. Often, however, one or more of the particular attributes are achieved at the expense of one or more other attributes.

Generally, the larger the free-area coefficient, i.e., the ratio of open area to total area, the lower the flow impedance caused by the vent at a given flow rate. Moreover, the lower the impedance, the lower the pumping power required to move a fixed amount of air through the perforations, which in the context of air vent covers in computing devices, typically results in a reduced amount of electrical power for operating one or more cooling fans of the computing device and lower fan induced acoustic noise. For example, typical net efficiencies of computer air moving devices, including motor, mechanical, and aerodynamic losses, require the net expenditure of electrical energy at a rate that is on the order of 2.5 to 5 times that of the original fluid pumping power.

In practice, the free-area coefficient of perforated patterns is limited by several factors. For example, in computing device applications having components with increasing clock speeds, to comply with electromagnetic compatibility (EMC) or electromagnetic interference (EMI) reduction requirements, the higher frequencies and corresponding shorter wavelengths associated with faster clock speeds require the maximum aperture size of the perforations be made smaller. Additionally, fabrication requirements limit the web thickness achievable for a given material thickness. The changing EMC reduction requirements and minimum allowable web thickness limitations effectively reduce the free-area coefficient of conventional perforated patterns, which increases the impedance of the perforated patterns at a given volumetric flow rate.

Depending on the application in which perforated patterns are used, the strength and stiffness of the object in which perforated patterns are formed can be important. For example, air vent covers may add structure and rigidity to a particular object, such as the door of a rack for storing computing devices. Additionally, filters must be sufficiently strong to withstand various impact forces caused by filtered and unfiltered objects. Therefore, in certain applications, perforated patterns should be designed to provide structure and rigidity, as well as to withstand impact forces if applicable.

Typical perforated patterns used in air flow and filtering objects include hexagonal, circular, and square, with each having certain advantages over the other. FIG. 1 shows a conventional perforated pattern 100 having circular shaped perforations 110 in a uniformly staggered arrangement formed in an object 120 and FIG. 2 shows a conventional perforated pattern 200 having hexagonal shaped perforations 210 also in a uniformly staggered arrangement formed in an object 220. Generally, perforation size and pitch (i.e., the number of perforations within a given area) are determined by employing simple equations based on aperture size and web thickness constraints to define a desirable opening to web area ratio for each pattern. Applying the equations under the same constraints, hexagonal perforated patterns, i.e., a repeating pattern of hexagonally shaped apertures, achieve the highest opening to web area ratio. Therefore, many air flow object manufacturers, such as computing device rack manufacturers, use vent covers that have conventional hexagonal perforated patterns.

Although hexagonal perforated patterns provide various advantages over other types of perforated patterns, e.g., circular and square perforated patterns, the other types of perforated patterns likewise can have certain advantages over hexagonal perforated patterns. For example, a hexagonal perforated pattern may have a higher opening to web area ratio, thus allowing a greater amount of air to flow through a vent cover, but a circular perforated pattern has higher shear and tensile stiffness. Therefore, it would be advantageous to provide a perforated pattern that achieves a desirable balance between these and/or other perforated pattern characteristics.

SUMMARY

The subject matter of the present application has been developed in response to the present state of the art, and in particular, in response to the problems and needs in the art that have not yet been fully solved by currently available objects employing perforated patterns. Accordingly, the subject matter of the present application has been developed to provide perforated patterns in objects that overcome at least some shortcomings of the prior art.

According to one embodiment of the present application, an apparatus includes an object and a perforated pattern formed in the object. The perforated pattern includes a plurality of perforations through which matter is flowable. Each of the perforations includes a modified hexagonal shape including a hexagon having six rounded corners.

In some implementations, the object is made of a predetermined material and a minimum web thickness between adjacent perforations is greater than or equal to a predetermined minimum allowable web thickness of the predetermined material.

According to some implementations, each perforation defines a major dimension and the perforated pattern defines a perforation pitch. Each rounded corner can have a radius based at least partially on the major dimension and perforation pitch. In some instances, each of the perforations has a size and shape dependent upon a desired openness of the perforated pattern. In these or other instances, each of the perforations has a size and shape dependent upon a desired stiffness of the object.

In yet some implementations, the perforated pattern reduces more electromagnetic interference than a perforated pattern having perforations comprising the hexagon without rounded corners. In these or other implementations, the perforated pattern provides more stiffness than a perforated pattern having perforations comprising the hexagon without rounded corners.

The object of the apparatus can have a height, width, and thickness where the height and width are substantially greater than the thickness. In one specific implementation, the object is or forms part of a door of a computing device rack. In this specific implementation, the matter includes cooling air for cooling at least one computing device supported by the rack.

According to another embodiment, a method for making an object having a perforated pattern through which matter is flowable includes determining a desired openness of the perforated pattern. The method also includes forming a perforated pattern in the object. The perforated pattern includes a plurality of modified hexagonal shaped perforations with each perforation having a hexagonal shape with six rounded corners. The size and shape of the perforations are dependent upon the desired openness of the perforated pattern.

In one implementation, the method further includes determining at least one desired material stiffness of the object selected from the group consisting of shear stiffness and tensile stiffness. In this implementation, the size and shape of the perforations are dependent upon the at least one desired material stiffness of the object. According to another implementation, the method further includes determining a desired amount of electromagnetic interference reduction. In this alternative implementation, the size and shape of the perforations are dependent upon the desired amount of electromagnetic interference reduction.

According to some implementations, forming each of the rounded corners of the modified hexagonal shaped perforations includes using a blend radius technique. According to other implementations, forming each of the rounded corners of the modified hexagonal shaped perforations includes using a circle overlaying technique.

According to one implementation, the object includes a substantially thin, plate-like element and forming the perforated pattern includes stamping the element.

According to yet another embodiment, a material flow regulator includes a plate-like element communicable in material receiving communication with a flow of material, e.g., fluid, and a modified hexagonally shaped perforated pattern formed in the plate-like element. The perforated pattern includes a plurality of perforations each having a substantially hexagonal shape with six rounded corners. A radius of each of the six rounded corners of each of the plurality of perforations is dependent upon a desired material flow capacity of the perforated pattern.

In some implementations of the material flow regulator, the plate-like element includes a portion of a door for a computing device rack and the radius of each of the six rounded corners of each of the plurality of perforations is further dependent upon a desired shear and tensile stiffness of the portion of the door.

In some implementations of the material flow regulator, the plate-like element includes a filter. The size of each of the plurality of perforations can be dependent upon a size of material to be filtered from the material flow. Additionally, the size of each of the plurality of perforations and the radius of each of the six rounded corners of each of the plurality of perforations can be further dependent upon a desired stiffness of the filter.

In yet some implementations of the material flow regulator, the plate-like element includes an air vent cover. The desired material flow capacity is a maximum air flow capacity for a given major dimension of the perforations and a given web thickness defined between adjacent perforations.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 3:
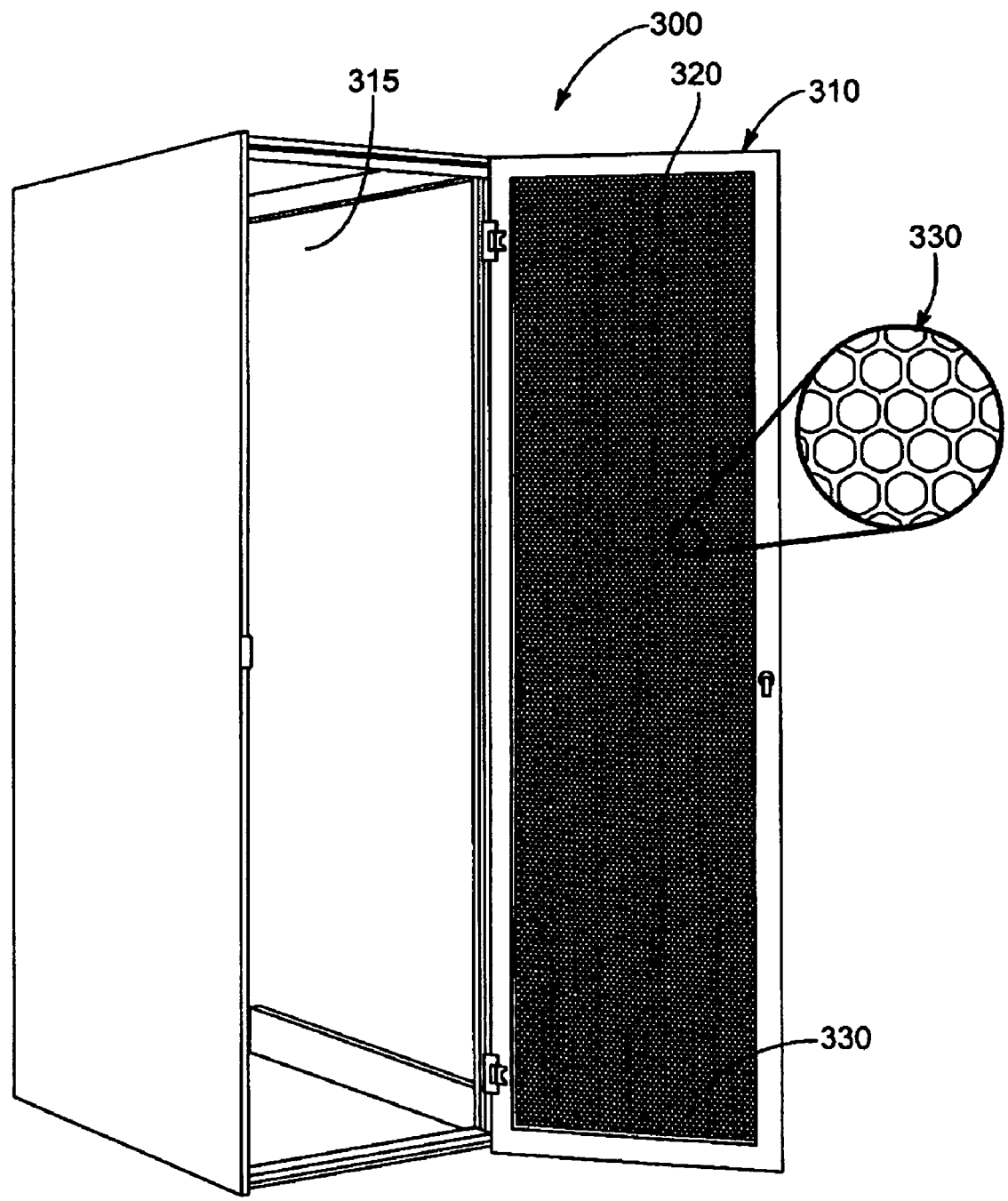
FIG. 3 is a perspective view of a computing device rack having a door with a modified hexagonal perforated pattern formed therein according to one representative embodiment of the present application.

Described herein are embodiments of various objects that have a modified hexagonal perforated pattern formed therein. In some embodiments, the object is an air vent cover for facilitating the air flow into and out of the covered vent. The vent can be formed as part of a computing device, such as, for example, a desktop computer, laptop computer, server, power distribution unit, etc., having a fan for cooling one or more processing devices, and the vent cover can be attached to or integrated with a portion of the computing device, such as a housing of the device. In alternative embodiments, the object forms a portion of a rack for supporting a plurality of computing devices. For example, the object can be or form part of a back, side, or front wall of the rack. In some implementations, the object is part of a door of the rack, such as a panel extending a substantial length and width of the door. According to one specific embodiment shown in FIG. 3, a computing device rack 300 includes a door 310 hingeably coupled to the device rack 300. When closed, the door 310 covers an open side 315, e.g., a front or back side, of the rack 300, through which the computing devices stored in the rack 300 are accessible. Preferably, the rack 300 is configured such that the door 310 covers a side of the rack 300 adjacent to the front or rear portions of the computing devices. In this manner, the door 310 can be opened to allow access to the front or rear portions of the computing devices.

The door 310 includes a panel 320 having a perforated pattern 330 formed thereon. The perforated pattern 330 facilitates the transfer of air through the door 310. Each of the computing devices typically includes a processing device, such as a processor or other integrated circuit, that operates to execute various functions on the computing device or other computing devices. Because a processing device generates large amounts of thermal energy, a cooling system is coupled to the processing device to dissipate heat from the processing device. Generally, a processing device cooling system includes a heat sink in thermal exchange communication with the processing device and a cooling fan inducing an air flow across the heat sink. The cooling air flow then exits the computing device and enters an interior space of the rack 300. From the interior space of the rack 300, the air flows through the perforated pattern 330 in the door 310 and out of the rack 300.

The combined air flow into and out of the various computing devices supported by the rack flow into and out of the rack 300 through the perforated pattern 330. Moreover, because the performance and efficiency of the processing device cooling systems are based at least partially on the amount of air allowed through the perforated patterns, the perforated pattern 330 can be designed to achieve a desired air flow capacity. The air flow capacity of a perforated pattern 330 is based on the openness, i.e., percent open or opening to web area ratio, of the perforated pattern 330.

In certain implementations, perforated patterns used in material flow regulators, such as fluid vent covers and material filters, can be configured to achieve an optimum openness. For example, in some fluid flow applications, i.e., applications where the object in which the perforated patter is formed does not provide significant structural support, the optimum openness of a perforated pattern can be a maximum openness of the perforated pattern 330 given a minimum web thickness of the material of the panel 320 without considering other factors. These applications can include, but are not limited to, fluid vent covers on or formed integrally with various fluid flow inducing devices, such as computing devices, air conditioners, heat exchangers, heaters, dryers, evaporators, etc. As defined herein, a fluid can be any of various flowable matter, such as, but not limited to, a gas (e.g., air) or liquid (e.g., liquid water). In other fluid flow and support applications, i.e., applications where the object in which the perforated pattern is formed provides structural support or must be impact resistant, the optimum openness can be dependent on the minimum web thickness of the material of the object and other factors, such as the strength and stiffness of the material. These applications can include, but are not limited to, doors to computing device racks (e.g., door 310 of rack 300) or other structures, material filters (e.g., solid matter filters), and finger safety guards to prevent access to hazardous areas.

Figure 4:
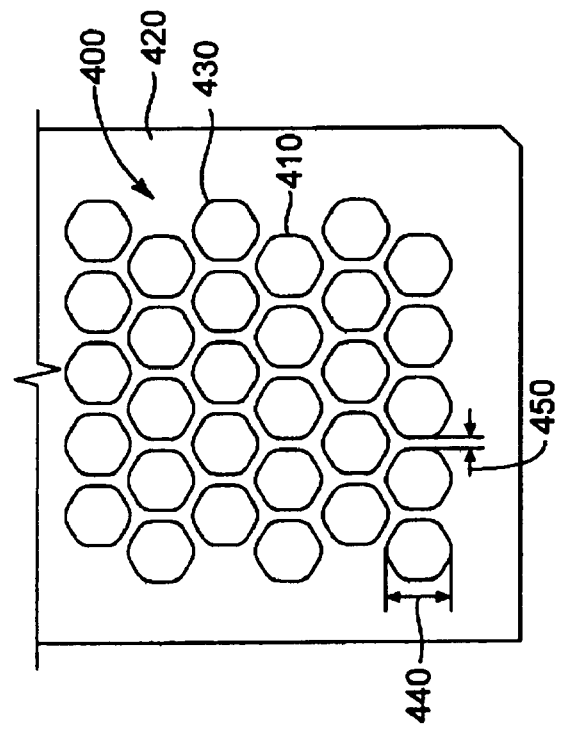
FIG. 4 shows a modified hexagonal perforated pattern having modified hexagonally-shaped perforations in an object.
Figure 1:
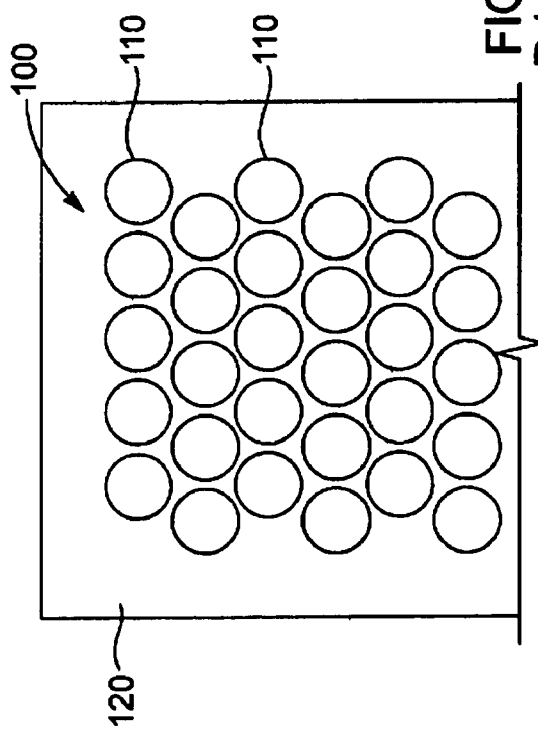
FIG. 1 shows a conventional circular perforated pattern having circularly-shaped perforations arranged on uniform equilateral triangle centers in an object.

Regardless of the application, the perforated patterns described herein (e.g., the perforated pattern 330) are modified hexagonal perforated patterns. Referring to FIG. 4, one example of a modified hexagonal perforated pattern 400 is shown. The modified hexagonal perforated pattern 400 is formed in an object 420 (e.g., door panel 320) and includes a uniformly staggered arrangement of modified hexagonally-shaped perforations 410. Generally, the shape of each modified hexagonally-shaped perforation 410 of the pattern 400 is a hexagon with rounded corners 430. Preferably, the rounded corners of each modified hexagonally-shaped perforation 410 are identically sized and shaped rounded corners. Each modified hexagonally-shaped perforation 410 defines a major dimension (e.g., major diagonal) 440 extending from the vertex of a first rounded corner 430 to the vertex of a second rounded corner 430 opposite the first rounded corner. Additionally, each modified hexagonal perforated pattern 400 defines a minimum web thickness 450 defined as the minimum distance between one perforation 410 and an adjacent perforation. In one specific instance, the rounded corners each have a radius that is less or equal to the minimum web thickness. In some embodiments, the radiuses of the rounded corners are determined based at least partially on a major dimension (e.g., a desired major dimension) and a pitch of the perforated pattern (e.g., a desired pitch). The pitch of the perforated pattern is at least partially dependent upon a desired openness of the pattern.

Similar to the modified hexagonal perforated pattern 400, the circular and fully hexagonal perforated patterns 100, 200 also define a similarly defined perforation major dimension and minimum web thickness.

Figure 5:
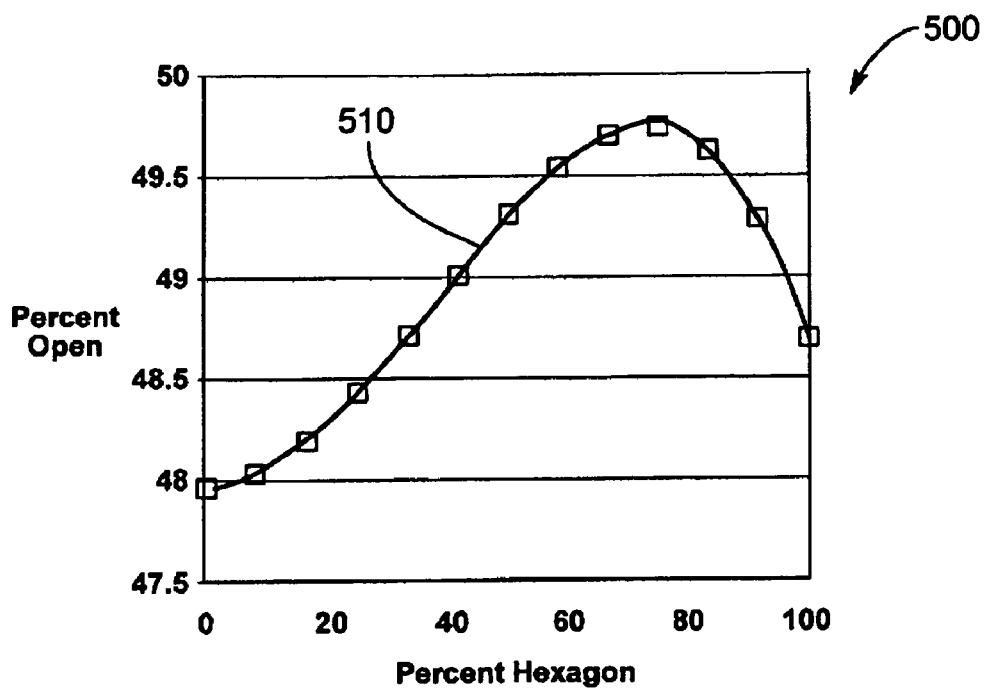
FIG. 5 shows a graph illustrating perforated pattern percent open values versus perforation shape percent hexagon values.

Referring to FIG. 5, a graph 500 shows openness or percent open to perforation shape data. More specifically, the graph 500 illustrates a percent open trend for perforation patterns having perforation shapes between a fully circular perforation shape (e.g., perforation 110) and a fully hexagonal shape (e.g., perforation 210). The data was obtained by holding constant the major dimension and minimum web thickness for each perforation pattern and varying the perforation shape. According to the data shown in the graph 500, the percent open of the variously shaped perforated patterns peaks at a perforated pattern having perforation shapes intermediate fully circular and fully hexagonal. The shape of the data curve 510 may change depending on the web thickness and major diagonal of the perforations. Therefore, the data curve 510 may peak at different perforation shapes depending on the web thickness and major diagonal dimensions, as well as any other applicable factors. In the context of FIG. 5, the modified hexagonal perforated patterns described herein are any of the perforated pattern shapes between the fully circular and fully hexagonal shapes.

In fluid flow applications, the perforated pattern perforation shape is desirably chosen to achieve a maximum fluid flow capacity, which is achievable using the perforated pattern with the highest openness. Thus, a graph 500 can be developed and used to determine the perforation shape that will achieve the highest openness and fluid flow capacity for a fluid flow application. As shown in the graph 500, the difference between the peak openness of a modified hexagonal perforated pattern and the openness for a fully hexagonal perforated pattern can be substantial. For example, in the graph 500, which represents one specific material and a specific set of constraining factors, the difference between the maximum openness of a modified hexagonal perforated pattern and the openness of a fully hexagonal perforated pattern is about 1%, which translates to about a 2% increase in fluid flow capacity. Although a 2% increase may seem insignificant, when spread out over may operating hours, such an increase in fluid flow capacity can significantly increase the performance and efficiency of computing devices by allowing a decrease in the energy (e.g., electricity) required to operating the cooling systems (e.g., cooling fans) and in the acoustic noise generated by the fan.

Although for most practical applications, maximum openness will occur at a perforation shape between about 50% fully hexagonal and about 100% fully hexagonal, in some applications, the maximum openness may occur at a perforation shape that is less than about 50% fully hexagonal.

For fluid flow and support applications, the modified hexagonally-shaped perforation at which the maximum openness occurs may not necessarily be the desired modified hexagonally-shaped perforation because the object in which the perforated pattern is formed may need to achieve other properties and characteristics. For example, because the panel 320 provides a significant portion of the structural strength and rigidity of the door 310, the perforated pattern 330 must be configured such that the panel has necessary properties for proper and continuous operation of the door 310 and maintaining the door's original "rectangular" shape. Generally, because the door 310 is attached at and swings around one side of the door 310, the panel 320 must be able to withstand a predefined level of shear stress and tensile stress. The ability of an object to withstand shear and tensile stress is directly dependent on the shear and tensile stiffness, respectively, of the object.

Figure 6:
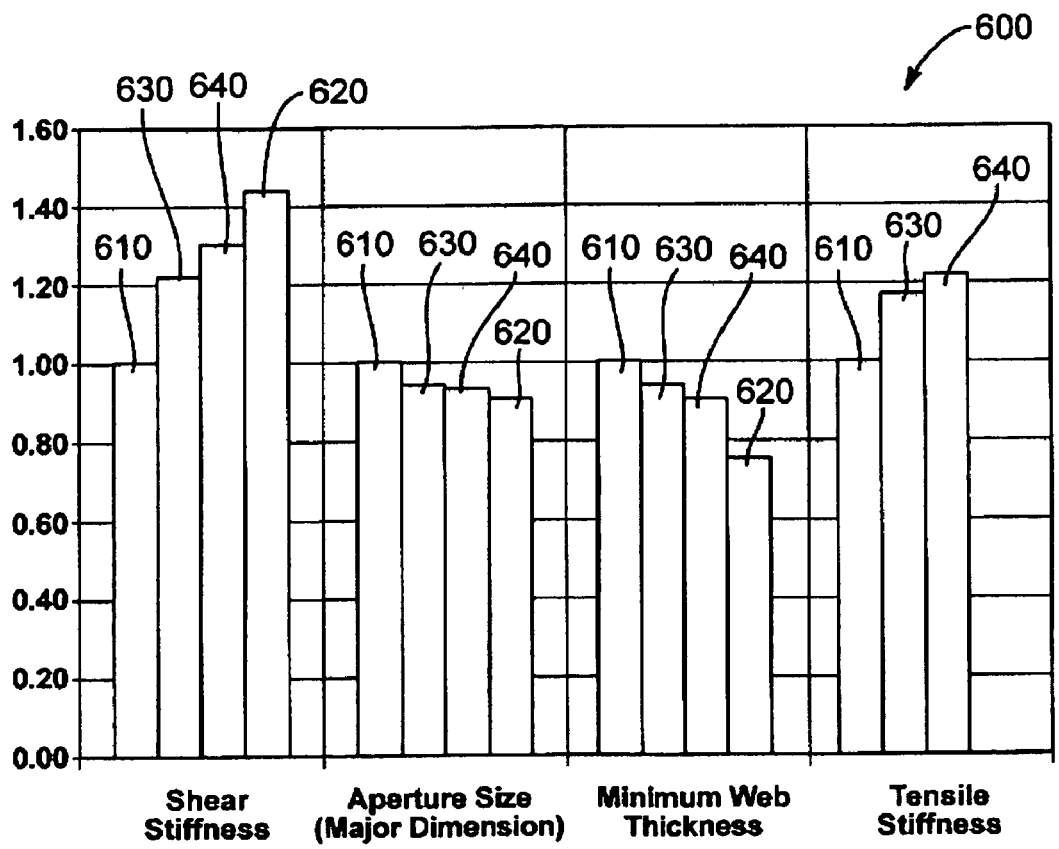
FIG. 6 is a graph illustrating shear stiffness, tensile stiffness, major dimension, and minimum web thickness values for respective perforated patterns having variously shaped perforations.

As shown in graph 600 of FIG. 6, while holding steady the openness of the perforated patterns in an object, the shear and tensile stiffness of the object changes according to the shape of the perforations. In one specific implementation, the openness of the perforated patterns is held steady at about 69%. In the graph 600, the data columns 610 represent a fully hexagonal perforated pattern, the data columns 620 represent a circular perforated pattern, the data column 630 represents a modified hexagonal perforated pattern with perforations having rounded corners of a first radius, and the data column 640 represents a modified hexagonal perforated pattern with perforations having rounded corners of a second radius larger than the first radius. For illustrative purposes only, in the illustrated embodiment of graph 600, the data column 630 corresponds to a modified hexagonal perforated pattern with a first radius of approximately 1.5 mm, the data column 640 corresponds to a modified hexagonal perforated pattern with a second radius of approximately 2.0 mm, and the data column 620 corresponds to a circle diameter of approximately 6.4 mm.

The graph 600 values are normalized with the values for the fully hexagonal perforated pattern set as unity (1.0). From the graph 600, the shear and tensile stiffness of the circular perforated pattern 620 is substantially higher than that of the fully hexagonal perforated pattern 610 for a given openness. The shear and tensile stiffness of the modified hexagonal perforated pattern with the first and second radius 630, 640, while less than the circular perforated pattern 620, is also substantially higher than that of the fully-hexagonal perforated pattern 610. For example, in the illustrated embodiment, the shear and tensile stiffness of the modified hexagonal pattern 630 are respectively about 22% and 14% higher than that of the fully hexagonal perforated pattern 610.

Even though the circular perforated pattern 620 has the highest shear and tensile stiffness, the minimum web thickness of the circular perforated pattern is significantly less than the other perforated patterns. Indeed, in practice, the minimum web thickness of the pattern could be below a minimum allowable web thickness of the material of the object being used. Accordingly, without decreasing the openness of the perforated patterns, the modified hexagonal perforated patterns 630, 640 provide the highest shear stiffness without the minimum web thickness falling below a minimum allowable web thickness of the material of which the object is formed. The minimum allowable web thickness is dependent on the properties of the material, the process for forming the perforated patterns (e.g., stamped or molded), or both. In preferred embodiments, the object is a plate-like or sheet-like element having a height and width substantially larger than a thickness and the perforated patterns are stamped into the object.

In addition to showing the increased shear and tensile strength of a modified hexagonal perforated pattern over a fully hexagonal perforated pattern, the graph 600 shows that modified hexagonal perforated patterns 630, 640 achieve a reduction in the major diagonal, which can results in finer mechanical filtering or improved EMI reduction characteristics. As discussed above, the smaller the aperture size in perforated patterns, the greater the reduction of EMI. As shown in FIG. 6, there is a significant step down in aperture size (e.g., major dimension) of the modified hexagonal perforated patterns 630, 640 compared to the fully hexagonal perforated pattern 610 even though the openness of the patterns is held constant. Therefore, in addition to increased shear and tensile strength, modified hexagonal perforated patterns provide improved EMI reduction over fully hexagonal perforated patterns.

Therefore, for fluid flow and support applications, a graph developed in a manner similar to that discussed above for graph 600 of FIG. 6 can be used to determine a desirable balance between fluid flow capacity and shear and tensile stiffness. As the openness is adjusted upwardly, the shear and tensile stiffness is decreased, similarly, as the openness is adjusted downwardly, the shear and tensile stiffness is increased. Accordingly, the openness of the perforated pattern can be adjusted upwardly or downwardly to achieve a desired fluid flow capacity and a desired shear and/or tensile stiffness depending on the application. Additionally, although not shown in graph 600 because it is proportional to the openness of the perforated pattern, normal stiffness can be adjusted by adjusting the openness of the pattern. This may be particularly relevant in solid matter filter applications where filters are continuously impacted by filtered and unfiltered solid matter flowing in a normal direction relative to the filter.

Figure 2:
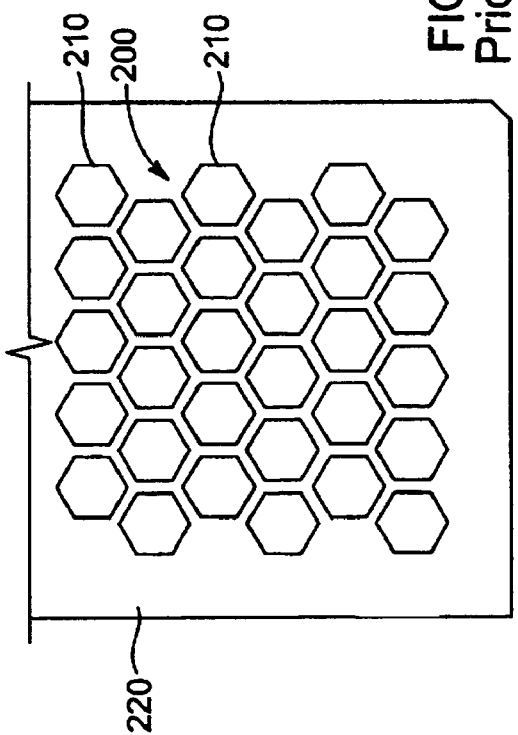
FIG. 2 illustrates a conventional hexagonal perforated pattern having hexagonally-shaped perforations in an object.

The fully hexagonal perforated pattern 200 (see FIG. 2) can be modified (e.g., the corners can be "rounded") in any of various ways to achieve a modified hexagonal perforated pattern, such as modified hexagonal perforated pattern 400 (FIG. 4), as described herein. Although many methods can be used, in one embodiment, an overlaying circle method is used, in another embodiment, a radius blending method is used, and in yet another embodiment, a straight line truncation method is used.

The overlaying circle method includes overlaying and centrally aligning a circle having a diameter equal to the desired major dimension of each of the modified hexagonal perforations on a hexagonal shape. The diameter of the circle is less than a major dimension of the hexagonal shape. The exposed portions of the hexagonal shape not overlapped by the circle are effectively "trimmed" away to create the modified hexagonal perforation. The specific modified hexagonal perforated pattern used to obtain the data shown in graph 500 of FIG. 5 included hexagonal perforations sized using the overlaying circle method. Although the data curve 510 represents a modified hexagonal perforated pattern with perforations sized using the overlaying method, in some embodiments, data curves similar to data curve 510 can be obtained for modified hexagonal perforated patterns with hexagonal perforations sized using other methods.

The radius blending method includes replacing each of the corners of the hexagonal shape with blend radius of a known radius value using conventional techniques known in the art, such as, for example, computer aided drafting (CAD) techniques. The specific modified hexagonal perforated pattern used to obtain the data shown in graph 600 of FIG. 6 included hexagonal perforations sized using the radius blending method. Moreover, the perforations 410 of the modified hexagonal perforated pattern 400 were determined using the radius blending method. Although the data of graph 600 represents a modified hexagonal perforated pattern with perforations sized using the radius blending method, in some embodiments, data similar to that shown in graph 600 can be obtained for modified hexagonal perforated patterns with hexagonal perforations sized using other methods.

The straight line truncation method includes truncating the six corners of the hexagonal shape using straight lines according to techniques commonly known in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for venting an electronic device, comprising:
    an object in an electronic device; and
    a perforated pattern formed in the object, the perforated pattern comprising a plurality of perforations through which matter is flowable, the plurality of perforations forming an interconnecting web that defines an opening to web area ratio, and a web thickness between perforations,
    each of the perforations comprising a modified hexagonal shape, the modified hexagonal shape comprising a hexagon having six rounded corners, each of the perforations comprising a major dimension and also a radius for each rounded corner in a perforation, the major dimension extending from the vertex of a first rounded corner to the vertex of the second rounded corner opposite the first rounded corner,
    wherein the radius of each rounded corner is chosen so the opening to web area ratio of the modified hexagonal shape is greater than the opening to web area ratio of perforations of a standard hexagonal shape, the standard hexagonal shape comprising a hexagonal shape without rounded corners, a major dimension of the standard hexagonal shape comprising a diagonal from a corner of the standard hexagonal shape to an opposite corner of the standard hexagonal shape and matching the major dimension of the modified hexagonal shape, and a web thickness between the standard hexagonal shapes matching the web thickness between the modified hexagonal shapes.

2. The apparatus of claim 1, wherein the radius of each rounded corner of the modified hexagonal shape is chosen so that:
    the opening to web area ratio of the modified hexagonal shape is greater than the opening to web area ratio of perforations of a standard hexagonal shape; and
    a minimum web thickness between adjacent perforations is greater than or equal to a predetermined minimum allowable web thickness of the predetermined material.

3. The apparatus of claim 2, wherein a radius of each of the six rounded corners of each of the plurality of perforations is chosen to meet a desired material flow capacity of the perforated pattern.

4. The apparatus of claim 1, wherein the radius of each rounded corner of the modified hexagonal shape is chosen to maximize the opening to web area ratio.

5. The apparatus of claim 1, wherein each of the perforations has a major dimension and radius of each rounded corner of the modified hexagonal shape dependent upon a desired opening to web area ratio of the perforated pattern.

6. The apparatus of claim 1, wherein the radius of each rounded corner of the modified hexagonal shape is chosen so that
    the opening to web area ratio of the modified hexagonal shape is greater than the opening to web area ratio of perforations of a standard hexagonal shape; and
    one or more of shear stiffness and tensile stiffness are greater than or equal to a predetermined minimum shear stiffness and tensile stiffness.

7. The apparatus of claim 1, wherein the major dimension of the modified hexagonal shape of the perforated pattern is chosen to meet a minimum requirement for electromagnetic interference.

8. The apparatus of claim 1, wherein the perforated pattern provides more stiffness than a perforated pattern having perforations comprising the hexagon without rounded corners with a same opening to web area ratio.

9. The apparatus of claim 1, wherein:
    the object comprises a height, width, and thickness; and
    the height and width are substantially greater than the thickness.

10. The apparatus of claim 1, wherein
the object comprises a door of a computing device rack; and
the matter comprises cooling air for cooling at least one computing device supported by the rack.

11. A method for making an object for venting an electronic device, the object having a perforated pattern through which matter is flowable, the method comprising:
determining a desired opening to web area ratio of the perforated pattern of the object, the object in an electronic device; and
forming a perforated pattern in the object, the perforated pattern comprising a plurality of modified hexagonal shaped perforations each comprising a hexagonal shape with six rounded corners, the plurality of perforations forming an interconnecting web that defines the opening to web area ratio, and a web thickness between perforations, each of the perforations comprising a major dimension and also a radius for each rounded corner in a perforation, the major dimension extending from the vertex of a first rounded corner to the vertex of the second rounded corner opposite the first rounded corner,
wherein forming the perforated pattern further comprises selecting a radius of each rounded corner so the opening to web area ratio of the modified hexagonal shape is greater than the opening to web area ratio of perforations of a standard hexagonal shape, the standard hexagonal shape comprising a hexagonal shape without rounded corners, a major dimension of the standard hexagonal shape comprising a diagonal from a corner of the standard hexagonal shape to an opposite corner of the standard hexagonal shape and matching the major dimension of the modified hexagonal shape, and a web thickness between the standard hexagonal shapes matching the web thickness between the modified hexagonal shapes.

12. The method of claim 11, further comprising determining at least one desired material stiffness of the object selected from the group consisting of shear stiffness and tensile stiffness, wherein the radius of each rounded corner of the modified hexagonal shape is chosen to meet the at least one desired material stiffness of the object.

13. The method of claim 11, further comprising determining a desired amount of electromagnetic interference reduction, wherein the major dimension is chosen to meet the desired amount of electromagnetic interference reduction.

14. The method of claim 11, wherein forming each of the rounded corners of the modified hexagonal shaped perforations comprises using a blend radius technique.

15. The method of claim 11, wherein forming each of the rounded corners of the modified hexagonal shaped perforations comprises using a circle overlaying technique.

16. The method of claim 11, wherein:
the object comprises a substantially thin, plate-like element; and
forming the perforated pattern comprises stamping the element.

17. A material flow regulator for venting an electronic device, comprising:
a plate-like element in an electronic device communicable in material receiving communication with a flow of air; and
a modified hexagonally shaped perforated pattern formed in the plate-like element, the perforated pattern comprising a plurality of perforations each having a substantially hexagonal shape with six rounded corners, the perforated pattern forming an interconnecting web that defines an opening to web area ratio, and a web thickness between perforations, each of the perforations comprising a major dimension and also a radius for each rounded corner in a perforation, the major dimension extending from the vertex of a first rounded corner to the vertex of the second rounded corner opposite the first rounded corner,
wherein a radius of each of the six rounded corners of each of the plurality of perforations is chosen so the opening to web area ratio of the modified hexagonal shape is greater than the opening to web area ratio of perforations of a standard hexagonal shape, the standard hexagonal shape comprising a hexagonal shape without rounded corners, a major dimension of the standard hexagonal shape comprising a diagonal from a corner of the standard hexagonal shape to an opposite corner of the standard hexagonal shape and matching the major dimension of the modified hexagonal shape, and a web thickness between the standard hexagonal shapes matching the web thickness between the modified hexagonal shapes.

18. The material flow regulator of claim 17, wherein:
the plate-like element comprises a portion of a door for a computing device rack; and
the radius of each of the six rounded corners of each of the plurality of perforations is further dependent upon a desired shear and tensile stiffness of the portion of the door.

19. The material flow regulator of claim 17, wherein:
the plate-like element comprises an electromagnetic filter that filters electronic waveforms;
the size of each of the plurality of perforations is dependent upon a wavelength to be filtered from the electronic waveforms; and
the size of each of the plurality of perforations and the radius of each of the six rounded corners of each of the plurality of perforations is further dependent upon a desired stiffness of the electromagnetic filter.

20. The material flow regulator of claim 17, wherein:
the plate-like element comprises an air vent cover; and
the desired material flow capacity is a maximum air flow capacity for a given major dimension of the perforations and a given web thickness defined between adjacent perforations.

* * * * *